Patented July 17, 1934

1,966,646

UNITED STATES PATENT OFFICE 1,966,646

PROCESS OF PRODUCING ALPHA-ARYL-AMINO-ANTHRAQUINONES

Donald G. Rogers, Hamburg, and James Ogilvie, Buffalo, N. Y., assignors to National Aniline & Chemical Company, Inc., New York, N. Y., a corporation of New York No Drawing. Application January 16, 1930, Serial No. 421,258

26 Claims. (Cl. 260—60)

This invention relates to the production of compounds which are arylamino-anthraquinones, and more particularly to the production of compounds which are 1- or 1.4-arylamino anthraquinones free from an arylamino-radical in the 2- and 3-positions of the anthraquinone nucleus.

Anthraquinone compounds which are 1- or 1.4-arylamino derivatives of anthraquinone are well known to the art both as intermediates for dyestuffs and as coloring materials. (Cf. Alizarin Cyanine Green, Color Index No. 1078.)

Various processes have been employed for the production of these compounds, some of which include as a step the condensation of a leuco-1.4-dihydroxyanthraquinone with a primary aromatic amine. As generally practiced in the art, the leuco-1.4-dihydroxyanthraquinones are prepared by the reduction of 1.4-dihydroxyanthraquinones, such as, quinizarin (1.4-dihydroxyanthraquinone), purporin (1.2.4-trihydroxyanthraquinone), etc. But these latter compounds are costly, which renders the alpha-arylamino-anthraquinone compounds prepared from them also costly.

It also has been proposed to produce arylamino-anthraquinones by condensing a primary aromatic amine with the relatively less expensive 2-chloro-1.4-dihydroxyanthraquinone (herein referred to as "ortho-chloroquinizarin"). The products thus obtained, however, contain an arylamino-radical in the 2-position of the anthraquinone nucleus.

It has furthermore been proposed to prepare leuco-quinizarin (leuco-1.4-dihydroxyanthraquinone) by heating orthochloroquinizarin in solution in a sulfuric-boric acid mixture with a finely divided metal. But this process is not commercially practicable because of the excessive time required for its operation, its requirement of careful, low temperature control, and the excessive foaming which occurs.

An object of the invention it to provide a process for the production of 1- or 1.4-arylamino-anthraquinone compounds (alpha-arylamino-anthraquinone compounds) which are substantially free from arylamino radicals in the 2- and 3-positions of the anthraquinone nucleus whereby said arylamino-anthraquinone compounds may be readily produced on a commercial scale.

Another object of the invention is to provide a process whereby an alpha-arylamino-anthraquinone compound which is substantially free from an arylamino-radical in the 2- and 3-positions of the anthraquinone nucleus may be directly obtained from an anthraquinone compound which contains a hydroxyl and/or an amino group in the 1- and 4-positions of the anthraquinone nucleus, and a halogen atom or a hydroxyl group in the 2-position.

A further object of the invention is to provide a process whereby an alpha-arylamino-anthraquinone compound may be obtained by the interaction of a primary aromatic amine, a reducing agent, and a 1.4-dihydroxyanthraquinone compound which contains a halogen atom or a hydorxyl group in the 2-position.

An additional object of the invention is to provide a process for the production of a mono- or di-alpha-arylamino-anthraquinone by the conjoint reduction of a 1.4-dihydroxyanthraquinone which contains a halogen atom or a hydroxyl group in the 2-position to a leuco-1.4-dihydroxyanthraquinone compound (herein referred to as a "leuco-quinizarin" compound) and condensation of said leuco-quinizarin compound with a primary aromatic amine.

A further object of the invention is to provide a process whereby an alpha-arylamino-anthraquinone compound may be obtained by the condensation of a primary aromatic amine with a leuco-alpha-hydroxyanthraquinone compound in the same reaction mixture in which the leuco-compound was produced.

Still another object of the invention is to provide a process for the reduction of an ortho-halogen-quinizarin to a leuco-quinizarin which is commercially feasible and rapid in its operation.

Other objects of the invention will in part be obvious and will in part appear hereinafter.

The invention accordingly comprises the several steps and the relation of one or more of such steps with respect to each of the others thereof which will be exemplified in the process hereinafter disclosed. The scope of the invention will be indicated in the claims.

According to the present invention, arylamino-anthraquinone compounds which are substantially free from an arylamino radical in the 2- and the 3-positions of the anthraquinone nucleus may be directly obtained from 1.4-disubstitutedanthraquinone compounds which contain the probable atomic grouping as a part of the anthraquinone nucleus

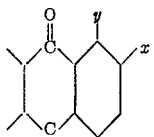

and especially the probable atomic grouping

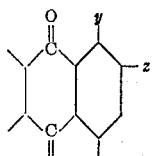

wherein $x$ represents a halogen atom or a hydroxyl group, $y$ represents a hydroxyl or amino group, and $z$ represents a halogen atom. We have found that such a 1.4-disubstituted-anthraquinone compound may be converted to a mono- or di-alpha-arylamino-anthraquinone compound which is substantially free from an arylamino radical in the 2- and 3-positions of the anthraquinone nucleus by a reduction of said anthraquinone compound to a leuco-anthraquinone compound with elimination of the 2-halogen or 2-hydroxyl group, and a condensation of said leuco-compound with a primary aromatic amine in the same reaction mixture in which said leuco-compound was produced. The process may be carried out as a single combined operation by causing the reduction and condensation to occur together; or the reduction may be first carried to completion, and the condensation then may be caused to take place; or the reduction may be partially completed, and the condensation then caused to occur simultaneously with a completion of the reduction.

In the practice of the invention in accordance with one method of procedure, a 1.4-dihydroxyanthraquinone compound which contains a halogen atom in the ortho-position to one of the hydroxyl groups, herein referred to as (an "ortho-halogen-quinizarin") may be reduced to a leuco-quinizarin by means of an organic carboxylic acid, more particularly an aromatic carboxylic acid, and a reducing metal (that is, a metal which will react with the acid to form a salt thereof) or salt. We have found that, in the reduction of an ortho-halogen-quinizarin to a leuco-quinizarin, the reaction takes place rapidly and smoothly by the employment of an organic carboxylic acid and a reducing metal or salt. The reaction may be brought about by adding the metal to a heated solution or suspension of the ortho-halogen-quinizarin in the carboxylic acid, preferably in the presence of an organic liquid as a solvent. At the completion of the reduction the leuco-quinizarin compound may be isolated, and further employed as desired. It is preferably left in the reaction mixture, however, and condensed with a primary aromatic amine for the production of an alpha-arylamino-anthraquinone.

In the practice of the invention in accordance with another method of procedure, a 1.4-dihydroxyanthraquinone compound which contains a halogen atom or a hydroxyl group in the ortho-position to one of the hydroxyl groups may be heated in suspension or solution with an organic carboxylic acid, a primary aromatic amine, and a reducing metal, to form a leuco-quinizarin, and the resulting reaction mixture may then be heated at a more elevated temperature to cause the condensation of the amine with the leuco-compound; whereby an alpha-arylamino-anthraquinone compound may be directly obtained in a single reaction mixture.

In practicing the invention in accordance with still another method of procedure, a 1.4-hdroxyanthraquinone compound which contains a halogen atom or a hydroxyl group in the ortho-position to one of the hydroxyl groups may be reduced by the use of a less amount of reducing agent than is theoretically required by the reaction

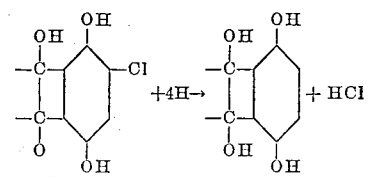

and then the reaction mixture, containing the incompletely reduced dihydroxyanthraquinone compound, may be condensed with a primary aromatic amine to form an alpha-arylamino-anthraquinone. The amine may be added after the partial reduction has taken place or at any other time; it is preferably included as a part of the original reaction mixture. Without limiting the invention to any particular theory, it is assumed that some of the dihydroxyanthraquinone compound is reduced to a leuco-quinizarin compound which condenses with the amine to form a leuco-arylamino-anthraquinone compound, which in turn acts to reduce more of the incompletely reduced dihydroxyanthraquinone compound to the leuco-quinizarin compound while being itself oxidized to the corresponding arylamino-anthraquinone. By carrying out the condensation, particularly the latter part thereof, in the presence of air or other oxidizing agents, the final portions of leuco-arylamino-anthraquinone may also be oxidized to the arylamino-anthraquinone. In this manner the whole amount of the dihydroxyanthraquinone compound may be converted to an arylamino-anthraquinone compound.

Among the 1.4-dihydroxyanthraquinone compounds which may be treated in accordance with the invention, there are included the 1.4-disubstituted-anthraquinone compounds which contain the probable atomic grouping as a part of the anthraquinone nucleus

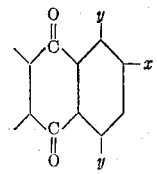

wherein $x$ represents a halogen atom or a hydroxyl group, and $y$ represents a hydroxyl or amino group; particularly the substituted and unsubstituted 1.2.4-trihydroxyanthraquinones and 2-halogen-1.4-dihydroxyanthraquinones, which contain the probable atomic grouping as a part of the anthraquinone nucleus.

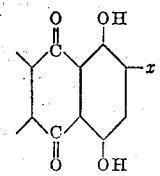

in which $x$ represents a halogen atom or a hydroxyl group. The invention is especially applicable to the ortho-substituted quinizarins which may be represented by the following probable formula

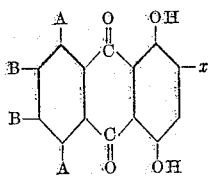

in which $x$ represents a hydroxyl group or a halogen atom (such as -Cl or -Br), A represents a hydrogen atom or a hydroxyl group, and B represents a hydrogen atom, a halogen atom, or an inorganic radical, such as -OH, -SO₃H, etc. To illustrate, the following compounds may be mentioned: 1.2.4-trihydroxyanthraquinone (purpurine); 1.2.3.4.6-tetrahydroxyanthraquinone (hydroxyflavopurpurin); 1.2.4.7 - tetrahydroxyanthraquinone (hydroxyanthrapurpurin); 1.2.4.5.8-pentahydroxyanthraquinone; 2 - chloro - 1.4 - dihydroxyanthraquinone (chloro - quinizarin); 2-bromo - 1.4 - dihydroxyanthraquinone (bromoquinizarin); 2 - chloro - 1.4.7.8 - tetrahydroxyanthraquinone (chloro-quinalizarin); bromo-quinalizarin; 2-chloro, or 2-bromo, -1.4.5.8-tetrahydroxyanthraquinone; 2 - chloro, or 2 - bromo, -1.4.5.8-tetrahydroxyanthraquinone - 6 - sulfonic acid; 2-chloro, or 2-bromo, -alizarin pentacyanine (1.4.5.7.8-pentahydroxyanthraquinone); 1-hydroxy-2-bromo-4-aminoanthraquinone; 1-hydroxy-2-chloro-4-aminoanthraquinone; etc. It is noted that when the anthraquinone compound contains additional halogen or sulfonic acid substituents in the beta-position, these also may be replaced by hydrogen during the reaction.

The organic carboxylic acid may be an aliphatic or an aromatic acid, e. g., acetic, benzoic, formic, salicylic, phthalic, acids, and the like. The process of the invention is preferably carried out in the presence of an organic liquid of suitable boiling point as a solvent or diluent. This liquid may be an excess of the organic carboxylic acid or the aromatic primary amine employed in the process, another organic carboxylic acid, another amine, or an inert solvent or diluent, such as an alcohol, a halogenated aromatic hydrocarbon (e. g., chlorobenzene, o-dichlorobenzene, trichlorobenzene, chloro-toluene, etc.), a hydrocarbon (such as solvent naphtha, high boiling kerosene, etc.), quinoline, quinaldine, dimethyl aniline, or the like, or mixtures of two or more of these substances. Technical o-dichlorobenzene, which is a mixture of chloro-derivatives of benzene of which 1.2-dichlorobenzene is the main constituent, is particularly suitable; inasmuch as the arylamino-anthraquinone compounds resulting from the condensation reaction are soluble in it, and can be directly obtained as a purified product by crystallization from the reaction mixture.

The reducing metal (e. g., zinc, iron, aluminum, tin, etc.) is preferably employed in a finely divided form, and is preferably added with agitation to the heated reaction mixture.

For substantially complete reduction of the quinizarin compound to a leuco-quinizarin, the reducing agent is preferably employed in at least sufficient amount to reduce the keto-groups of the anthraquinone nucleus and to replace the halogen or hydroxyl substituent in the 2-position of the anthraquinone nucleus with a hydrogen atom. When the leuco-quinizarin is to be condensed with a primary aromatic amine in the same reaction mixture in which it is produced, it is not necessary to employ an amount of reducing agent theoretically required completely to reduce the ortho-substituted quinizarin compound, as has been hereinbefore indicated.

The primary aromatic amine employed in producing the arylamino-anthraquinone compound may be any of the amines heretofore employed in the art for the purpose. Primary aromatic amines of the benzene series, (e. g., aniline, p-toluidine, etc.) are preferably employed, however, as they lead to the production of the more valuable arylamino-anthraquinone compounds.

The condensation with the primary aromatic amine is preferably carried out with the aid of a condensing agent, particularly when complete conversion to the di-alpha-arylamino-compound is desired. As condensing agent there may be used an organic carboxylic acid (e. g., acetic acid, benzoic acid, etc.), a metal salt of an inorganic acid or of an organic carboxylic acid (e. g., zinc chloride, zinc benzoate, zinc acetate, tin salts, etc.), a hydrohalide of an aromatic primary amine, such as, the hydrochloride of the amine being employed as one of the reagents, (e. g., aniline hydrochloride, toluidine hydrochloride, etc.), boric acid, or other well-known condensing agents for the reaction. By carrying out the condensation in the same reaction medium in which the leuco-quinizarin compound is produced by the employment of a reducing metal or salt and an organic carboxylic acid, the carboxylic acid and/or the metal salt of the carboxylic acid resulting as a by-product of the reduction may act as the condensing agent; so that the employment of an additional condensing agent is not required. The condensation reaction may be carried out in the presence or absence of air.

As illustrative embodiments of a manner in which the invention may be carried into practice, the following examples are presented: the parts are by weight.

*Example 1.*—375 parts of technical ortho-chloro-quinizarin, 600 parts of benzoic acid, 410 parts of p-toluidine and 750 parts of technical o-dichlorobenzene are heated together to a temperature of about 60° C. 140 parts of zinc dust is then gradually added with stirring. Heat is evolved, and the temperature spontaneously rises. After the zinc has all been added, the mixture is allowed to stand with stirring, to permit substantial completion of the reduction (about 15 minutes), and is then heated to about 155°–160° C. and maintained at that temperature until the condensation is substantially complete (about 3 hours). Water which is evolved is permitted to escape. About 750 parts of dichlorobenzene is then added to increase the fluidity of the mass when cooled, and the mixture is cooled with stirring to about 25° C. and allowed to crystallize. The resulting 1.4-di-p-tolylaminoanthraquinone (quinizarin green base) crystals are filtered off, and washed with alcohol or other suitable solvent for the impurities. It is then purified by digestion with dilute sulfuric or other mineral acid, filtration, and washing with water; and dried at about 100° C. An analysis of the product shows a chlorine content of about 0.2 per cent.

*Example 2.*—285 parts of purpurin, 550 parts of salicylic acid, 335 parts of p-toluidine, and 600 parts of chlorotoluene are heated together to a temperature of about 60° C. 115 parts of zinc dust is added with stirring. After completion of the reduction operation, the temperature is raised to about 150°–160° C. and maintained at that temperature until the condensation is complete, as indicated by colorimetric tests. The p-toluido-anthraquinone thus produced is then isolated as described in Example 1.

*Example 3.*—375 parts of technical ortho-chloro-quinizarin, 700 parts of benzoic acid and 1200 parts of technical o-dichlorobenzene are heated together at a temperature of about 60° C., and 180 parts of zinc dust is gradually added thereto with stirring. The temperature of the mixture spontaneously rises and the chloroquinizarin is reduced to leuco-quinizarin, which is soluble in the dichlorobenzene. After completion of the reduction, which requires about 15 minutes, 360 parts of aniline is added and the reaction mixture is heated to a temperature of about 150°–160° C., and maintained at said temperature until colorimetric tests indicate substantial completion of the reaction. The water which is evolved during the condensation is allowed to escape. The anilido-anthraquinone formed is isolated by steam distilling, with or without the addition of dilute mineral acid; filtering; and washing the filter-cake with water. The crude dianilido-anthraquinone thus obtained may then be further purified by recrystallization from aniline, or other suitable solvents.

*Example 4.*—Ortho-chloroquinizarin is reduced to leuco-quinizarin with zinc and benzoic acid in the manner described in Example 3. The leuco-quinizarin is isolated from the reaction mixture by pouring it into a dilute mineral acid (e. g., sulfuric acid), to convert the zinc compounds present to water soluble zinc salts; steam distilling the mixture to remove the dichlorobenzene; then filtering hot, leaving the leuco-quinizarin as a residue on the filter; washing the leuco-quinizarin with alcohol or other suitable solvent for the impurities; and drying. The leuco-quinizarin thus obtained is in the form of a yellow solid. It can be further purified, if desired, by recrystallization from toluene, dichlorobenzene or other suitable solvent. The leuco-quinizarin may also be recovered from the reaction mixture by adding alcohol thereto, which causes the leuco-quinizarin to crystallize out.

It will be realized that the invention is not limited to the processes and the details thereof set forth in the foregoing examples. Thus, the invention may be carried out with a variety of 1.2.4-trisubstituted anthraquinone compounds, particularly ortho-substituted-quinizarin compounds; e. g., 1.4-di-hydroxy-anthraquinone compounds which contain a halogen atom or a hydroxyl group in the 2-position. The reduction and/or condensation may be carried out in the presence or absence of an organic liquid as a solvent or diluent; and if a solvent or diluent is used, it may be an excess of one of the reagents or any suitable inert liquid, such as those hereinbefore enumerated. The amount of solvent or diluent used may be varied. The use of too great a quantity of solvent should be avoided, however, if the product is to be recovered by crystallization from the reaction mixture; otherwise the yield of arylamino-anthraquinone compound produced will be decreased by loss in the mother-liquor during the separation. Instead of zinc, other reducing metals or salts may be employed, e. g., aluminum, tin, iron, stannous salts, etc.; and other carboxylic acids may be used, e. g., acetic acid, formic acid, phthalic acid, etc. The proportions of reducing metal and carboxylic acid may also be varied. Proportions of about 2 mols of zinc to about 4 mols of benzoic acid may be employed per mol of ortho-chloroquinizarin to effect its substantially complete reduction to leuco-quinizarin. With other reducing metals and acids equivalent amounts may be used. The organic carboxylic acid is preferably employed in an amount somewhat in excess of that theoretically required for complete reaction with the metal in order to prevent difficulty in the isolation of the product due to the presence of unreacted metal.

The reduction may be carried out at higher or lower temperatures than those above given, but with the quantities of reagents given in the above examples, stirring is difficult at temperatures much below 60° C. The use of too elevated temperatures should preferably be avoided owing to the danger of too vigorous reaction. A preferred reduction temperature is accordingly about 60° C. to about 110° C.

The leuco-quinizarin compounds also may be isolated in any other desirable manner, and may be employed for other purposes than the preparation of amino-anthraquinones; e. g., for the preparation of quinizarin compounds by oxidation, etc.

The condensation of the arylamine with the leuco-quinizarin may be completed at other temperatures, and if it is desired to produce a monoarylamino-anthraquinone, lower temperatures, e. g., 120° to 140° C., and/or lesser amounts of the primary aromatic amine should be employed in carrying out the condensation. The arylamino-anthraquinone compound also may be separated from the reaction mixture and purified in any other desired manner.

Inasmuch as the 2-position and the 3-position of 1.4-dihydroxyanthraquinone are equivalent, where in the description and claims reference is made to a substituent in the 2-position, the equivalent substituent in the 3-position is obviously included.

Since in carrying out the above process certain changes may be made without departing from the scope of the invention, it is intended that all matter contained in the above description shall be interpreted as illustrative and not in a limiting sense, the invention to be limited only by the claims.

We claim:

1. The process of producing a leuco-anthraquinone which comprises subjecting an anthraquinone compound in which one of the benzene nuclei corresponds with the formula

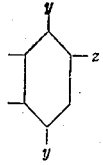

in which $z$ represents a halogen atom, and $y$ represents a hydroxyl or an amino group, to the reducing action of an organic carboxylic acid and a metal which will react with said organic acid to form a salt thereof, whereby said halogen atom is eliminated and the anthraquinone nucleus is reduced.

2. The process of producing a leuco-anthraquinone which comprises subjecting an anthraquinone compound in which one of the benzene nuclei corresponds with the formula

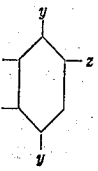

in which z represents a halogen atom, and y represents a hydroxyl or an amino group, to the reducing action of an organic carboxylic acid and a metal which will react with said organic acid to form a salt thereof, in the presence of an organic liquid as a solvent, whereby said halogen atom is eliminated and the anthraquinone nucleus is reduced.

3. The process of producing a leuco-quinizarin which comprises subjecting a 1.4-dihydroxyanthraquinone compound which corresponds with the probable formula:

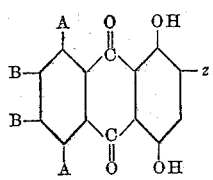

in which z represents a halogen atom, A represents a hydrogen atom or a hydroxyl group, and B represents a hydrogen atom, a halogen atom or an inorganic radical, to the reducing action of an organic carboxylic acid and a metal which will react with said organic acid to form a salt thereof.

4. The process of producing a leuco-quinizarin which comprises subjecting an ortho-halogen quinizarin to the reducing action of an organic carboxylic acid and a metal which will react with said organic acid to form a salt thereof.

5. The process of producing leuco-quinizarin which comprises heating 2-halogen-1.4-dihydroxyanthraquinone with zinc and an organic carboxylic acid in the presence of an inert organic liquid as a solvent.

6. The process of producing leuco-quinizarin which comprises heating ortho-chloroquinizarin with zinc and an organic carboxylic acid in the presence of an organic liquid as a solvent.

7. The process of producing leuco-quinizarin which comprises heating ortho-chloroquinizarin with zinc and benzoic acid in the proportions of about 2 mols of zinc and about 4 mols of benzoic acid, in the presence of dichlorobenzene as a solvent, at a temperature of about 60° C. to 110° C.

8. The process of producing an alpha-arylamino-anthraquinone compound which comprises reducing an anthraquinone in which one of the benzene nuclei corresponds with the formula

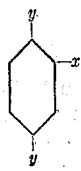

in which x represents a halogen atom or a hydroxyl group, and y represents a hydroxyl or an amino group, to a leuco-anthraquinone compound, and condensing the resulting leuco-anthraquinone compound, while still contained in the reaction mixture in which it was produced, with an aromatic primary amine to form an alpha-arylamino-anthraquinone compound.

9. The process of producing an alpha-arylamino-anthraquinone compound which comprises reducing an anthraquinone in which one of the benzene nuclei corresponds with the formula

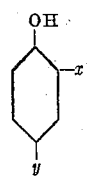

in which x represents a halogen atom or a hydroxyl group, and y represents a hydroxyl or an amino group, to a leuco-anthraquinone compound, and condensing the resulting leuco-anthraquinone compound, while still contained in the reaction mixture in which it was produced, with an aromatic primary amine to form an alpha-arylamino-anthraquinone compound.

10. The process of producing an alpha-arylamino-anthraquinone compound which comprises reducing a 1.4-dihydroxyanthraquinone compound which corresponds with the probable formula

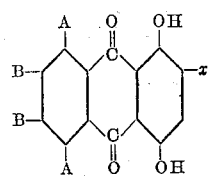

in which x represents a halogen atom or a hydroxyl group, A represents a hydrogen atom or a hydroxyl group, and B represents a hydrogen atom, a halogen atom, or an inorganic radical, to a leuco-1.4-dihydroxyanthraquinone compound, and condensing the resulting leuco-1.4-dihydroxyanthraquinone compound, while still contained in the reaction mixture in which it was produced, with a primary amine of the benzene series to form an alpha-arylamino-anthraquinone compound.

11. The process of producing an alpha-arylamino-anthraquinone compound which comprises reducing a 1.4-dihydroxyanthraquinone in which one of the benzene nuclei corresponds with the formula

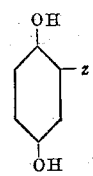

in which z represents a halogen atom or a hydroxyl group, to a leuco-1.4-dihydroxyanthraquinone compound, and condensing the resulting leuco - 1.4 - dihydroxyanthraquinone compound, while still contained in the reaction mixture in which it was produced, with an aromatic primary amine to form an alpha-arylamino-anthraquinone compound.

12. The process of producing an alpha-arylamino-anthraquinone which comprises reducing 2-halogen-1.4-dihydroxyanthraquinone to leuco-quinizarin, and condensing said leuco-quinizarin, while still contained in the reaction mixture in which it was produced, with a primary amine of the benzene series to form an alpha-arylamino-anthraquinone.

13. The process of producing an alpha-arylamino-anthraquinone compound which comprises subjecting an anthraquinone in which one of the benzene nuclei corresponds with the formula

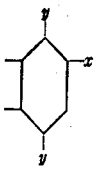

in which $x$ represents a halogen atom or a hydroxyl group, and $y$ represents a hydroxyl or an amino group, to the reducing action of an organic carboxylic acid and a metal which will react with said organic acid to form a salt thereof, whereby a leuco-anthraquinone compound is produced, and condensing the resulting leuco-anthraquinone compound, while still contained in the reaction mixture in which it was produced, with an aromatic primary amine to form an alpha-arylamino-anthraquinone compound.

14. The process of producing an alpha-arylamino-anthraquinone compound which comprises adding to a heated reaction mixture which includes a 1.4-dihydroxyanthraquinone in which one of the benzene nuclei corresponds with the formula

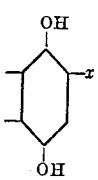

in which $x$ represents a halogen atom or a hydroxyl group, a primary aromatic amine, an organic carboxylic acid, and an inert organic liquid as a solvent, a metal which will react with said carboxylic acid to form a salt thereof, whereby a leuco-quinizarin compound is produced, and then further heating the reaction mixture to form an alpha-arylamino-anthraquinone compound.

15. The process of producing an alpha-arylamino-anthraquinone compound which comprises heating a 1.4-dihydroxyanthraquinone compound which corresponds with the probable formula

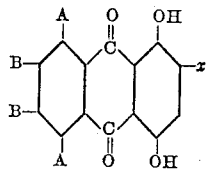

in which $x$ represents a halogen atom or a hydroxyl group, A represents a hydrogen atom or a hydroxyl group, and B represents a hydrogen atom, a halogen atom or an inorganic radical, with an organic carboxylic acid and a metal which will react with said organic acid to form a salt thereof, whereby a leuco-quinizarin compound is produced, and condensing the resulting leuco-quinizarin compound, while still contained in the reaction mixture in which it was produced, with an aromatic primary amine to form an alpha-arylamino-anthraquinone compound.

16. The process of producing an alpha-arylamino-anthraquinone compound which comprises subjecting a 1.4-dihydroxyanthraquinone compound which corresponds with the probable formula

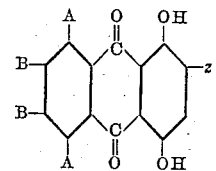

in which $z$ represents a halogen atom, A represents a hydrogen atom or a hydroxyl group, and B represents a hydrogen atom, a halogen atom or an inorganic radical, to the reducing action of an organic carboxylic acid and a metal which will react with said organic acid to form a salt thereof whereby a leuco-quinizarin compound is produced, and condensing the resulting leuco-quinizarin compound, while still contained in the reaction mixture in which it was produced, with an aromatic primary amine of the benzene series to form an alpha-arylamino-anthraquinone compound.

17. The process of producing a 1.4-diarylamino-anthraquinone compound which comprises adding zinc to a heated reaction mixture which contains a 1.4-dihydroxyanthraquinone compound which corresponds with the probable formula

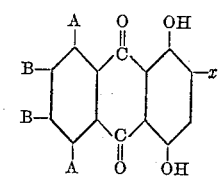

in which $x$ represents a halogen atom or a hydroxyl group, A represents a hydrogen atom or a hydroxyl group, and B represents a hydrogen atom, a halogen atom, or an inorganic radical; a primary amine of the benzene series; an inert organic liquid as a solvent; and a carboxylic acid of the benzene series; whereby a leuco-quinizarin compound is produced; and then heating the reaction mixture at a more elevated temperature to form a 1.4-diarylamino-anthraquinone compound.

18. The process of producing an alpha-arylamino-anthraquinone compound which comprises heating a 1.4-dihydroxyanthraquinone compound which corresponds with the probable formula

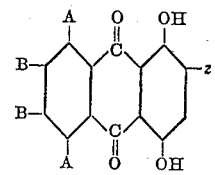

in which $z$ represents a halogen atom, A represents a hydrogen atom or a hydroxyl group, and B represents a hydrogen atom, a halogen atom or an inorganic radical, with zinc and an organic carboxylic acid in the presence of a halogenated hydrocarbon as a solvent, whereby a leuco-quinizarin compound is produced, and condensing the resulting leuco-quinizarin compound, while still contained in the reaction mixture in which it was produced, with a primary amine of the benzene series to form an alpha-arylamino-anthraquinone compound.

19. The process of producing a 1.4-diarylamino-anthraquinone compound which comprises heating ortho-chloroquinizarin with zinc and an aromatic carboxylic acid, in the presence of a halogenated hydrocarbon of the benzene series as a solvent, whereby leuco-quinizarin is produced, and heating the reaction mixture containing the leuco-quinizarin with a primary amine of the benzene series to form a 1.4-diarylamino-anthraquinone compound.

20. The process of producing a 1.4-diarylamino-anthraquinone which comprises adding zinc to a reaction mixture which contains chloroquinizarin, a primary amine of the benzene series, a halogenated hydrocarbon of the benzene series as a solvent, and a carboxylic acid of the benzene series, heated to a temperature of about 60° to 110° C., whereby leuco-quinizarin is produced, and then heating the reaction mixture at a temperature of about 150° to 160° C. to form a 1.4-diarylamino-anthraquinone.

21. The process of producing an alpha-arylamino-anthraquinone compound which comprises heating a reaction mixture which contains a 1.4-dihydroxyanthraquinone compound which corresponds with the probable formula

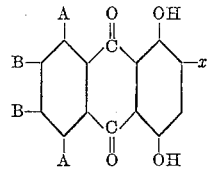

in which $x$ represents a halogen atom or a hydroxyl group, A represents a hydrogen atom or a hydroxyl group, and B represents a hydrogen atom, a halogen atom, or an inorganic radical; a primary amine of the benzene series; and an organic carboxylic acid and a metal adapted to react with said carboxylic acid to form a salt thereof, in an amount less than that theoretically required completely to reduce the said dihydroxyanthraquinone compound to a leuco-quinizarin compound; whereby a leuco-quinizarin compound is formed; and then further heating the reaction mixture to form an alpha-arylamino-anthraquinone compound.

22. The process of producing an alpha-arylamino-anthraquinone compound which comprises heating a reaction mixture which contains a 1.4-dihydroxyanthraquinone compound which corresponds with the probable formula

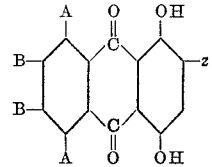

in which $z$ represents a halogen atom, A represents a hydrogen atom, or a hydroxyl group, and B represents a hydrogen atom, a halogen atom, or an inorganic radical; a primary amine of the benzene series; and zinc and an organic carboxylic acid in an amount less than that theoretically required completely to reduce the said dihydroxyanthraquinone compound to a leuco-quinizarin compound; whereby a leuco-quinizarin compound is formed; and then further heating the reaction mixture to form an alpha-arylamino-anthraquinone compound.

23. The process of producing an alpha-arylamino-anthraquinone compound which comprises adding zinc to a heated reaction mixture which comprises 2-halogen-1.4-dihydroxyanthraquinone, a primary amine of the benzene series, and an organic carboxylic acid, whereby leuco-quinizarin is produced, and then heating the reaction mixture at a more elevated temperature to form an alpha-arylamino-anthraquinone compound.

24. The process of producing an alpha-arylamino-anthraquinone compound which comprises adding zinc to a reaction mixture which contains chloroquinizarin, a primary amine of the benzene series, a halogenated hydrocarbon of the benzene series as a solvent, and a carboxylic acid of the benzene series, heated to a temperature of about 60° to 110° C., whereby leuco-quinizarin is produced, and then heating the reaction mixture at a more elevated temperature to form an alpha-arylamino-anthraquinone compound.

25. The process of producing 1.4-ditoluido-anthraquinone which comprises heating a reaction mixture which contains ortho-chloroquinizarin, dichlorobenzene, p-toluidine, and benzoic acid and zinc in an amount less than that theoretically required completely to reduce the ortho-chloroquinizarin to leuco-quinizarin, whereby a leuco-quinizarin is formed, and then further heating the reaction mixture to form 1.4-ditoluido-anthraquinone.

26. The process of producing 1.4-ditoluido-anthraquinone which comprises heating 375 parts of ortho-chloro-quinizarin, 600 parts benzoic acid, 410 parts of p-toluidine, and 750 parts of technical -o-dichlorobenzene at a temperature of about 60° C., adding 140 parts of zinc dust, with stirring, then raising the temperature to about 150° to 160° C., maintaining the reaction mixture at that temperature until condensation is substantially complete, and recovering the 1.4-ditoluido-anthraquinone thereby produced.

DONALD G. ROGERS.
JAMES OGILVIE.

Certificate of Correction

Patent No. 1,966,646.  July 17, 1934.

DONALD G. ROGERS, ET AL.

It is hereby certified that errors appear in the printed specification of the above numbered patent requiring correction as follows: Page 2, line 83, for "hdroxy-" read *dihydroxy-*; and lines 90 to 96 for the first part of the formula

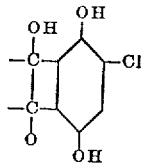

read

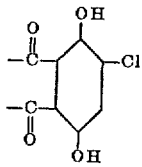

and that the said Letters Patent should be read with these corrections therein that the same may conform to the record of the case in the Patent Office.

Signed and sealed this 25th day of September, A. D. 1934.

[SEAL]

LESLIE FRAZER,
*Acting Commissioner of Patents.*